(12) United States Patent
Heusermann et al.

(10) Patent No.: US 7,593,916 B2
(45) Date of Patent: Sep. 22, 2009

(54) MANAGING DATA ADMINISTRATION

(75) Inventors: Knut Heusermann, Rauenberg (DE); Ingo Bruss, Heidelberg (DE); Christiane Kuntz-Mayr, Limburgerhof (DE); Joachim Brechtel, Homburg/Saar (DE)

(73) Assignee: SAP AG, Walldorf (DE)

( * ) Notice: Subject to any disclaimer, the term of this patent is extended or adjusted under 35 U.S.C. 154(b) by 394 days.

(21) Appl. No.: 10/921,512

(22) Filed: Aug. 19, 2004

(65) Prior Publication Data

US 2006/0041588 A1 Feb. 23, 2006

(51) Int. Cl.
G06F 7/00 (2006.01)

(52) U.S. Cl. .......................... 707/1; 707/101; 707/102; 707/104.1; 705/1; 705/12; 705/705

(58) Field of Classification Search ...... 707/100–104.1, 707/9, 1, 10; 705/1, 12, 26; 713/200–201, 713/167–169
See application file for complete search history.

(56) References Cited

U.S. PATENT DOCUMENTS

| | | | | |
|---|---|---|---|---|
| 5,838,970 A * | 11/1998 | Thomas | ...... | 719/316 |
| 5,941,947 A * | 8/1999 | Brown et al. | ...... | 709/225 |
| 6,141,665 A * | 10/2000 | Hara et al. | ...... | 705/1 |
| 6,236,997 B1 * | 5/2001 | Bodamer et al. | ...... | 707/10 |
| 6,321,238 B1 * | 11/2001 | Putzolu | ...... | 707/205 |
| 6,502,103 B1 * | 12/2002 | Frey et al. | ...... | 707/103 R |
| 6,609,123 B1 * | 8/2003 | Cazemier et al. | ...... | 707/4 |
| 6,694,335 B1 * | 2/2004 | Hopmann et al. | ...... | 707/201 |
| 6,725,428 B1 * | 4/2004 | Pareschi et al. | ...... | 715/530 |
| 6,757,689 B2 * | 6/2004 | Battas et al. | ...... | 707/101 |
| 6,792,607 B1 * | 9/2004 | Burd et al. | ...... | 707/102 |
| 6,892,210 B1 * | 5/2005 | Erickson et al. | ...... | 707/201 |
| 7,092,973 B2 * | 8/2006 | Muehl et al. | ...... | 707/203 |
| 7,293,031 B1 * | 11/2007 | Dusker et al. | ...... | 707/101 |
| 7,350,191 B1 * | 3/2008 | Kompella et al. | ...... | 717/108 |
| 2001/0044751 A1 * | 11/2001 | Pugliese et al. | ...... | 705/26 |
| 2002/0035562 A1 * | 3/2002 | Roller et al. | ...... | 707/6 |
| 2002/0072974 A1 * | 6/2002 | Pugliese et al. | ...... | 705/14 |

(Continued)

OTHER PUBLICATIONS

"Change Management Needs Integrated Process and Configuration management"—Gregor Joeris—ACM SIGSOFT Software Engineering Notes, 1997—6th European Software Engineering Conference, Zurich, Swiss, 1997, portal.acm.org (psu.edu) (pp. 1-17).*

(Continued)

*Primary Examiner*—Jean B Fleurantin
*Assistant Examiner*—Anh Ly
(74) *Attorney, Agent, or Firm*—Schwegman, Lundberg & Woessner, P.A.

(57) ABSTRACT

Data administration may be managed by receiving in a computer system a first input identifying a data object to be assigned to a control object in the computer system. A second input for the control object is received in the computer system. The second input specifies a relationship between 1) model-level changes to the data object, and 2) instance-level changes to the data object. After the first and second inputs are received, the control object is sent to another computer system. The control object may be accessed to determine whether a system is authorized to make an object change. This access can be by the system about to make the change, or by a system that receives the object change from another system.

20 Claims, 3 Drawing Sheets

U.S. PATENT DOCUMENTS

| | | | |
|---|---|---|---|
| 2002/0107864 A1* | 8/2002 | Battas et al. | 707/101 |
| 2002/0107957 A1* | 8/2002 | Zargham et al. | 709/224 |
| 2002/0161771 A1* | 10/2002 | Boshko | 707/100 |
| 2002/0173984 A1* | 11/2002 | Robertson et al. | 705/1 |
| 2002/0178077 A1* | 11/2002 | Katz et al. | 705/26 |
| 2003/0018490 A1* | 1/2003 | Magers et al. | 705/1 |
| 2003/0074342 A1* | 4/2003 | Curtis | 707/1 |
| 2003/0084053 A1* | 5/2003 | Govrin et al. | 707/100 |
| 2003/0115143 A1* | 6/2003 | Kahn et al. | 705/51 |
| 2003/0204421 A1* | 10/2003 | Houle et al. | 707/104.1 |
| 2003/0208460 A1* | 11/2003 | Srikant et al. | 707/1 |
| 2003/0217027 A1* | 11/2003 | Farber et al. | 707/1 |
| 2003/0220860 A1* | 11/2003 | Heytens et al. | 705/35 |
| 2003/0220901 A1* | 11/2003 | Carr et al. | 707/1 |
| 2003/0229884 A1* | 12/2003 | Carr et al. | 717/101 |
| 2004/0103182 A1* | 5/2004 | Krabel et al. | 709/223 |
| 2004/0117377 A1* | 6/2004 | Moser et al. | 707/10 |
| 2004/0122869 A1* | 6/2004 | Muehl et al. | 707/201 |
| 2004/0143606 A1* | 7/2004 | Pauly et al. | 707/200 |
| 2004/0181544 A1* | 9/2004 | Anderson | 707/102 |
| 2004/0186762 A1* | 9/2004 | Beaven et al. | 705/8 |
| 2004/0210607 A1* | 10/2004 | Manchanda et al. | 707/203 |
| 2004/0215476 A1* | 10/2004 | Harvey et al. | 705/1 |
| 2004/0249823 A1* | 12/2004 | Raghuvir et al. | 707/100 |
| 2004/0267694 A1* | 12/2004 | Sakai et al. | 707/1 |
| 2004/0267751 A1* | 12/2004 | Dill et al. | 707/9 |
| 2005/0021348 A1* | 1/2005 | Chan et al. | 705/1 |
| 2005/0027683 A1* | 2/2005 | Dill et al. | 707/2 |
| 2005/0060309 A1* | 3/2005 | Scheerer | 707/5 |
| 2005/0125429 A1* | 6/2005 | Corston-Oliver et al. | 707/100 |
| 2005/0138085 A1* | 6/2005 | Verma et al. | 707/202 |
| 2005/0154748 A1* | 7/2005 | Kraiss | 707/102 |
| 2005/0188161 A1* | 8/2005 | Taguchi | 711/152 |
| 2005/0203911 A1* | 9/2005 | Heusermann et al. | 707/10 |
| 2005/0240621 A1* | 10/2005 | Robertson et al. | 707/102 |
| 2005/0256798 A1* | 11/2005 | Herter et al. | 705/37 |
| 2005/0257197 A1* | 11/2005 | Herter et al. | 717/116 |
| 2006/0004803 A1* | 1/2006 | Aschen et al. | 707/101 |
| 2006/0095439 A1* | 5/2006 | Buchmann et al. | 707/100 |

OTHER PUBLICATIONS

"An object-oriented Organizational Model to Support Dynamic Role-based Access Control in Electronic Commerce Applications"—Edward C. Cheng—System Science, 1999, HICSS-32, Proceedings of the $32^{nd}$ Annual Hawaii International Conference—date: Jan. 5-8, 1999 (pp. 1-9).*

"CRM Products: Customer Enhancements for Downloading and Uploading Product Master Data (Release 3.0)", 40 pages, copyright 2001.

* cited by examiner

MANAGING DATA ADMINISTRATION

TECHNICAL FIELD

This description relates to managing data administration in a computer system.

BACKGROUND

Data administration generally includes the rights, in a computer environment, to create, change, delete and take other action with regard to information. Particularly, information in form of data objects may be administered by someone, such as a particular system or a specific user, who has the proper privileges. Any object, such as a product object, typically is based on an object model that defines its behavior and the segments it consists of, and this information may be stored as "master data" or equivalent in the system. Objects corresponding to specific products, then, and their respective segments, can be created as instances of the master data and can be used for a variety of purposes. There is a distinction between changing some aspect of the master data, which may be considered a model-level object change, and changing the value of the object or one of its instances, which may be considered an instance-level object change. For example, when a product object has a segment called "product descriptions," any user action on the descriptions of the product—such as creating, changing or deleting—may be considered a model-level change. Continuing this example, an instance of this segment may be an English language description, and changing or deleting this description may be considered an instance-level change.

Existing solutions may rely on a centralized entity that monitors data ownership among several systems. Any system that seeks to take an action with regard to the object may have to query the monitor before doing so. One disadvantage of such solutions is that communications with the monitor may take some time and may delay other tasks that need to be performed. Moreover, many systems are today coupled in landscape arrangements, where there may not be a common technology between all different systems and therefore no natural "center" that can manage data ownership, which is another term for data administration.

Another existing solution assigns the right to maintain an object to its creator. This functionality is not intended as a data administration feature, but focuses on recording the historical fact of what system (or other entity) initially created the object. Such systems have the disadvantage that the data ownership cannot be changed to a different entity. This can be a problem, particularly in situations where several systems are weakly coupled together in a landscape. If a system is deliberately decoupled from the system, whether temporarily or permanently, the remaining systems may lack data administration rights to the decoupled system's objects.

SUMMARY

The invention relates to managing data administration.

In a general aspect, a method comprises receiving, in a computer system, a first input identifying a data object to be assigned to a control object in the computer system. A second input for the control object is received in the computer system. The second input specifies a relationship between 1) model-level changes to the data object, and 2) instance-level changes to the data object. After receiving the first and second inputs, the control object is sent to another computer system.

In selected embodiments, the control object may specify, for a particular segment of the data object, a control system that is authorized to change the particular segment. The particular segment may be one selected from the group consisting of: a product, a location, a plant, a language, and combinations thereof. The control object may further specify an exception where another control system is authorized to change the particular segment. A change to the particular segment that is not made by the control system may be rejected.

In selected embodiments, the first input may specify that any newly created object is to be assigned to the control object. The first input may be used to create an object allocation rule for control object. When the newly created object belongs to a class identified by the object allocation rule, the newly created object may be assigned to the control object.

Advantages of the systems and techniques described herein may include any or all of the following: Providing an improved way of managing data administration; providing a more flexible identification of a system that is authorized to administer a data object; providing a changeable data administration control; providing data administration that manages a relationship between model-level object changes and instance-level object changes; providing data administration with improved handling of unauthorized changes; and providing data administration with an improved enqueue mechanism.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
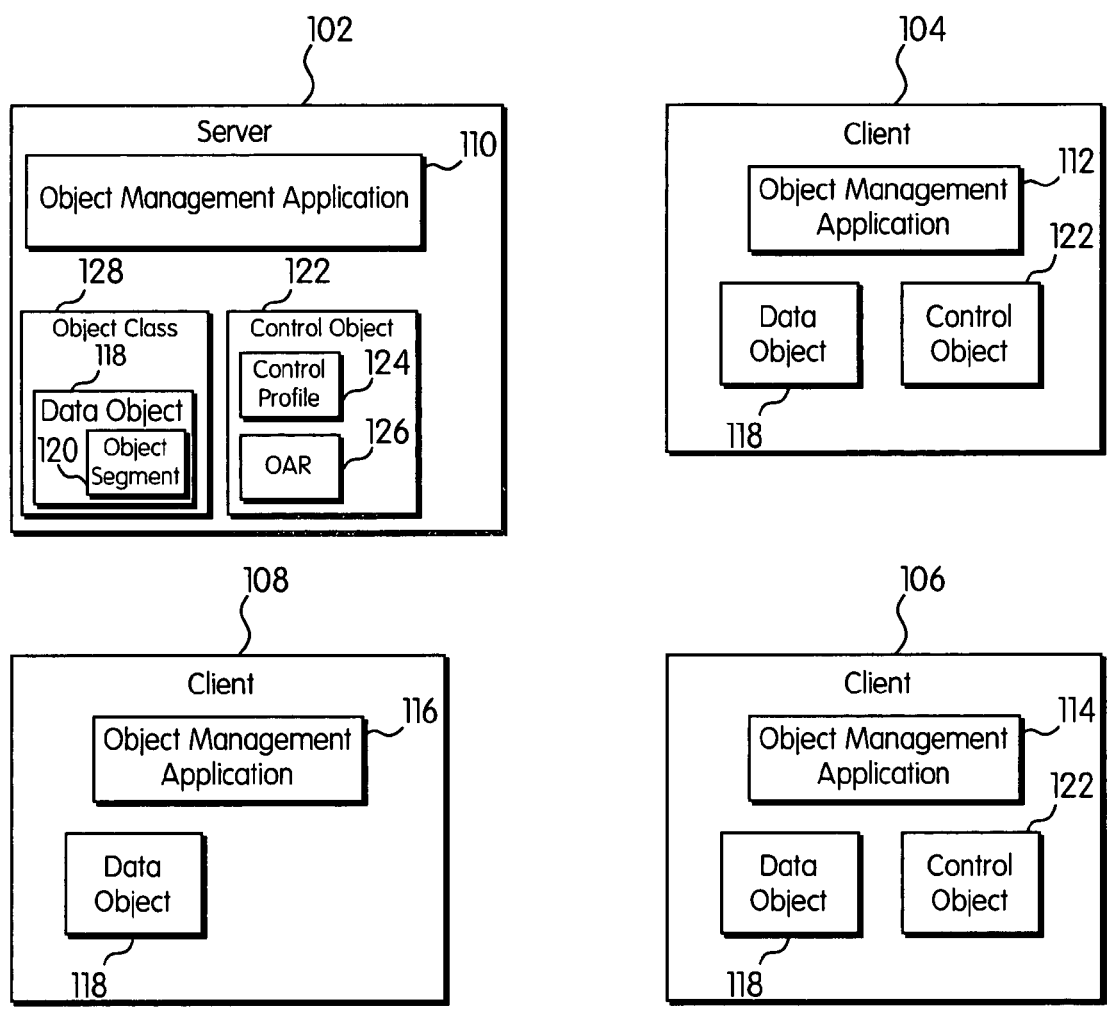
FIG. 1 schematically shows computer systems in a landscape.

FIG. 1 shows a landscape 100 that includes four systems: a server system 102 and three client systems 104, 106 and 108. Each of the systems can handle objects for one or more purposes, for example through respective object management applications 110, 112, 114 and 116. The application in each system may be the same as, or different from, the application in any other system. The systems can share data within the landscape 100, for example by exchanging messages. In this example, the server 102 includes a data object (DO) 118 that is to be shared with any or all of the other systems.

The DO may correspond to a product, a technical asset, a contact, a partner or any other item or tangible. The DO is a specific instance of master data for this particular object; that is, it is a specific instance of the object model. The DO may include one or more object segment 120 that is a specific instance of a segment in the object model.

Each object segment 120 is associated with an identifier for the system that owns the segment. For example, when the system 102 creates the DO and assigns a value to the segment 120, it may associate its system ID with that segment. Thus, any system in the landscape 100 that is configured to take data ownership into account will, upon a user seeking to change the segment 120, access the system ID to determine if it is authorized to make the change. If the system determines that it does not own the segment, it may reject the change. Similarly, if such a system receives an object change made by another system, it may access the system ID of the segment to determine whether the sending system is authorized to make the change.

The above examples relate to instance-level object changes. To further manage the data administration of the DO, a control object (CO) 122 will be created. Particularly, the CO may regulate data ownership for model-level object changes and may specify a relationship between model-level object changes and instance-level object changes. The CO can be created in any system, for example one that creates a new object instance, and it can be distributed to any or all other systems in the landscape, together with the DO or separately.

A system can create the CO upon a user making a specific input. For example, the server 102 may prompt a user to identify a data object that should be assigned to the CO. Assume that the user specifies the DO 118 in this example. The server receives a first input that identifies the DO to be assigned to the CO. Accordingly, the server may assign the DO to the CO. Moreover, the server may prompt the user to specify a relationship between model-level, and instance-level, changes to the DO. Assume that the user specifies that the system that owns model-level changes can overwrite instance-level changes made by any other system (typically by a system whose system ID is assigned to the segment instance). The server receives a second input that specifies a relationship between model-level changes to the DO and instance-level changes to the DO. Accordingly, the server ensures that this information is included in the CO.

After receiving the first and second inputs, the server may distribute the CO in the landscape 100. Here, the server sends the CO to the client 104 and the client 106. The client 108, in contrast, does not receive the CO. This may be because the systems in the landscape 100 are merely weakly coupled to each other and the server 102 is not aware of the client 108. Nevertheless, the systems 104 and 106 can use the CO for determining data ownership, for example by their respective object management application being configured to access the CO when appropriate.

There are different ways that systems in the landscape 100 can be integrated in data administration management. For example, a system that can import and export object data to other systems may be considered fully integrated. Another system, in contrast, may be configured to only import data from one other (exporting) system. Yet another system may only export data to one other (importing) system. The CO can be used to regulate data ownership among systems with these and other configurations.

As a practical example, assume that a user prompts the client 106 to make an model-level change in the DO 118. For example, the user seeks to change some aspect of the segment 120. The client, which is configured to evaluate data ownership, accesses the CO 122 for this purpose. Finding that it has the authority, the client updates the DO as requested. Moreover, the client may be configured to share the object change with other systems in the landscape 100. Accordingly, the client distributes the updated DO 118. The system(s) receiving the updated DO, in turn, may access their respective CO to verify that the sender is authorized to make the change. For example, the server 102 may access the CO 122 and determine that the client 106 owns model-level changes in the object 118. The server therefore accepts the received object change and may update the DO accordingly. If, in contrast, the server had determined that the client 106 was not authorized to change the DO, it may have rejected the received object change. It is noted that upon receiving the object change in this implementation, the receiving system does not verify (by accessing the CO or otherwise), whether the receiving system is authorized to make the change.

Similarly, in a situation where the server 102 owns the right to make model-level changes in the DO, it may make the requested change(s) and distribute the updated DO to other systems. The receiving systems, in turn, may access their respective COs to verify that the sender has the authority.

Another scenario is that a system in the landscape, such as the client 108, does not have the CO 122 and makes a change in the DO 118. Distributing this object change may lead to inconsistencies and errors. However, if the receiving system accesses its CO to determine whether the client 108 is authorized to make the change, it may determine that another system has the data ownership rights and can therefore reject the received object change.

The server also can update the CO. For example, a user may request, by making an appropriate input, a change in the data ownership of one or more object segments or in the relationship between model-level and instance level object changes, to name two examples. Upon so changing the CO, the server also may distribute it in the landscape 100 so that the systems that are configured to verify data ownership have access to the current version of the CO. On that note, any or all of the systems may be configured to reject distribution of a CO if they already have received a newer version of that CO. That is, the CO may include a timestamp or equivalent information about when it was created. Accordingly, before accepting a distributed CO, the receiving system may check whether the CO is older than any existing version.

An example of the contents that can be included in the CO will now be described. System behavior is here described from a user interface point of view. For example, the CO 122 may include a control profile 124 that regulates the data ownership. The control profile may be documented in any suitable form, such as in a table. The following is an example of such a table:

TABLE 1

| Segment Type | Segment ID | Control System | Relationship |
|---|---|---|---|
| Product | | Server | Overwrite |
| SettypeID | MDM_MARC_COMM | Server | |
| PlantID | 1000 | EU3_003 | |
| ExtensionID | COMM_PR_GTIN | | Active |
| TextType | Description | | |
| LanguageCode | FI | OULU_01 | |

The Segment Type column in Table 1 can list any or all types of segment that is included in the DO 118. Here, the top entry in this column is "Product," which refers to the product to which the DO 118 corresponds. That is, this line of Table 1 relates to the DO 118 as a whole. The Segment ID column is here empty because the entry relates to the product itself. The Control System column specifies the control system, that is, the system that has data administration rights to the DO. Here, this entry assigns these rights to the server 102. For example, this field is filled with the system ID for the creator of the CO. The Relationship column specifies the relationship between model-level and instance-level changes to the DO. A user can make an input specifying this relationship, and the input information may result in a corresponding entry being made in this column. Here, an "Overwrite" entry signifies that the server 102 generally can overwrite any instance data created by others in the landscape. This may, however, be subject to exceptions, as will be described later.

The second line of Table relates to a "SettypeID" type of segment. Like all segments of this DO, it is subordinate to the Product segment. The segment ID for the SettypeID is given in the second column and the Control System column specifies that the server 102 is the control system for this segment.

Subordinate items in Table 1 automatically inherit the settings of the segment to which they belong. Accordingly, the SettypeID segment inherits the "Overwrite" entry in the Relationship column from the Product. Strictly speaking, it is therefore not necessary for Table 1 to include the SettypeID entry, because it does not change any setting of the Product. Nevertheless, it is included here because one of its subordinate segments is an important exception in Table 1.

This subordinate segment type is PlantID and in this example its ID is "1000". Unlike the two segments above it in Table 1, the PlantID data is not managed by the server 102. Rather, the CO specifies that a system "EU3_003" manages the model-level changes for this segment. This means that the server can make all model-level object changes for the SettypeID except those pertaining to PlantID 1000. The PlantID item has no entry in the Relationship column, meaning that it inherits the (Overwrite) setting from the above segment. Accordingly, the control system EU3_003 can overwrite instance data for this segment.

The next line of Table 1 includes another segment at the same level as SettypeID. It's Segment ID is COMM_PR_GTIN. Moreover, it does not have an entry in the Control System column, which means it inherits the (server 102) setting of the Product. However, it does have an entry in the Relationship column that says "Active". This means that the control system (here the server 102) manages the COMM_PR_GTIN segment yet should not overwrite an instance thereof that already exists. Particularly, a control system can add more entries of this segment but cannot change or delete existing segment instances. That is, while the control system may be considered the owner of this particular instance, its ability to change or delete the instance may be limited.

The next line of Table 1 includes a "TextType" segment type, which is identified as a description. For example, this segment may be a description of the product to which the DO corresponds. The segment has no entries in the Control System or Relationship columns, meaning that it generally inherits the values from the Product segment. One of its subordinate segments, however, is an exception. This segment is of the type "LanguageCode" and its ID is "FI", which indicates that it relates to the Finnish language code; that is, to a Description written in Finnish. The Control System column states "OULU_01". This means that, for this segment it is not the server 102 that has the data ownership (nor is it the EU3_003 system, because this segment is not subordinate to the PlantID segment type). Rather, the OULU_01 system has the right to make model-level object changes in this segment. The relationship to instance-level changes remains "Overwrite" as inherited from the Product segment.

A CO can be assigned to a single object, such as the DO 118, or to several data objects. In some implementations, newly created data objects that meet a certain condition are automatically assigned to the CO. For example, the CO may include an object allocation rule (OAR) 126 specifying that any newly created data object in an object class 128 is to be assigned thereto. One example of an OAR is that a CO is assigned to a product category, and therefore to all products assigned to the product category.

As an example, a CO can be used to realize a weak enqueue mechanism. Particularly, the CO may be broadcast before work on an object assigned to the CO is initiated. For example, the CO may include only the top element in Table 1; here, the Product segment type. Thereby, the maintenance and distribution of the product object is blocked unless and until the user takes back the CO. However, systems lacking data administration functionality may nevertheless make (unauthorized) object changes, hence the term "weak" enqueue mechanism.

The above examples involve computer systems labeled as clients and server. In other implementations, none of the systems in the landscape 100 may fit the description of being a client or a server. Also, any system in the landscape may be a physical system, that is, corresponding to a single physical computer device, or a logical system, that is, corresponding to a virtual share of a device that also includes other systems. Accordingly, two or more of the exemplary devices 102, 104, 106 and 108 may reside on the same physical device in some implementations.

Figure 2:
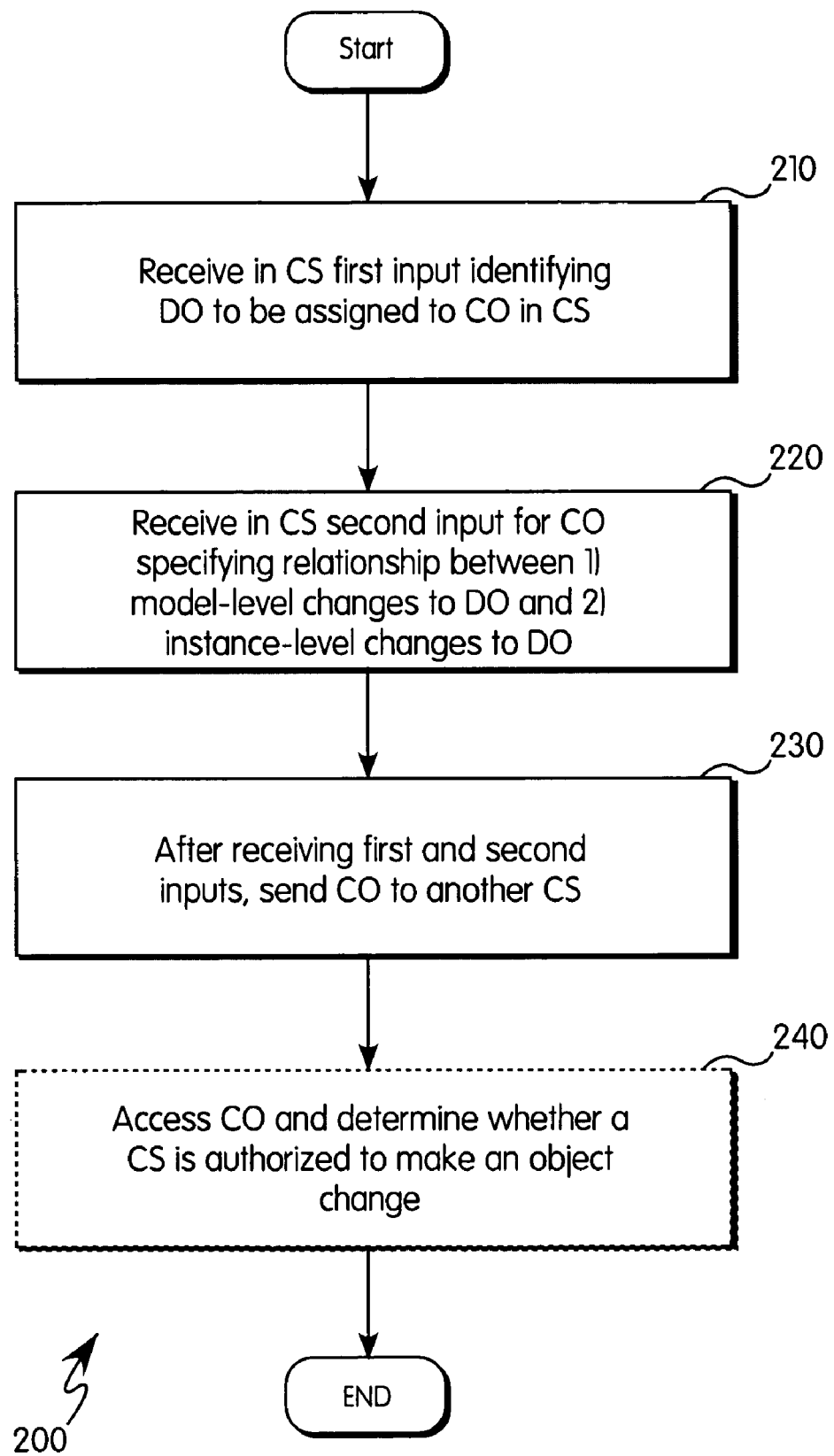
FIG. 2 shows a flow chart of an embodiment of an inventive method.

FIG. 2 is a flow chart of a method 200. The method 200 may be performed in a system in a landscape. For example, a computer program product may include instructions that cause a processor to perform operations comprising the steps of the method 200. The method 200 includes the following steps:

Receiving, in step 210 and in a computer system, a first input identifying a data object to be assigned to a control object in the computer system. For example, the first input may be made in the server 102 and may specifically identify that the DO 118 is to be assigned to the CO 122. As another example, the first input may specify that any newly created object is to be assigned to the CO 122, and the server 102 may use this first input to create the OAR 126.

Receiving, in step 220 and in the computer system, a second input for the control object. The second input specifies a relationship between 1) model-level changes to the data object, and 2) instance-level changes to the data object. For example, the second input may be made in the server 102 and may specify that the relationship is "Overwrite" or "Active". The server 102 may incorporate this input in the CO 122, for example in the control profile 124.

After receiving the first and second inputs, sending, in step 230, the control object to another computer system. For example, after receiving the first and second inputs the server may send the CO 122 to any or all of the systems 104, 106 and 108.

Accessing, in optional step 240, the control object and determining whether a computer system is authorized to make an object change. For example, upon receiving an object update from the system 106, the server 102 may access the CO 122 and determine whether the client 106 owns model-level changes in the DO 118. As another example, the server 102 may, upon a user prompting it to change the DO 118, access the CO 122 and determine whether the server owns model-level changes in the object. The system may reject proposed changes that the CO does not authorize.

Figure 3:
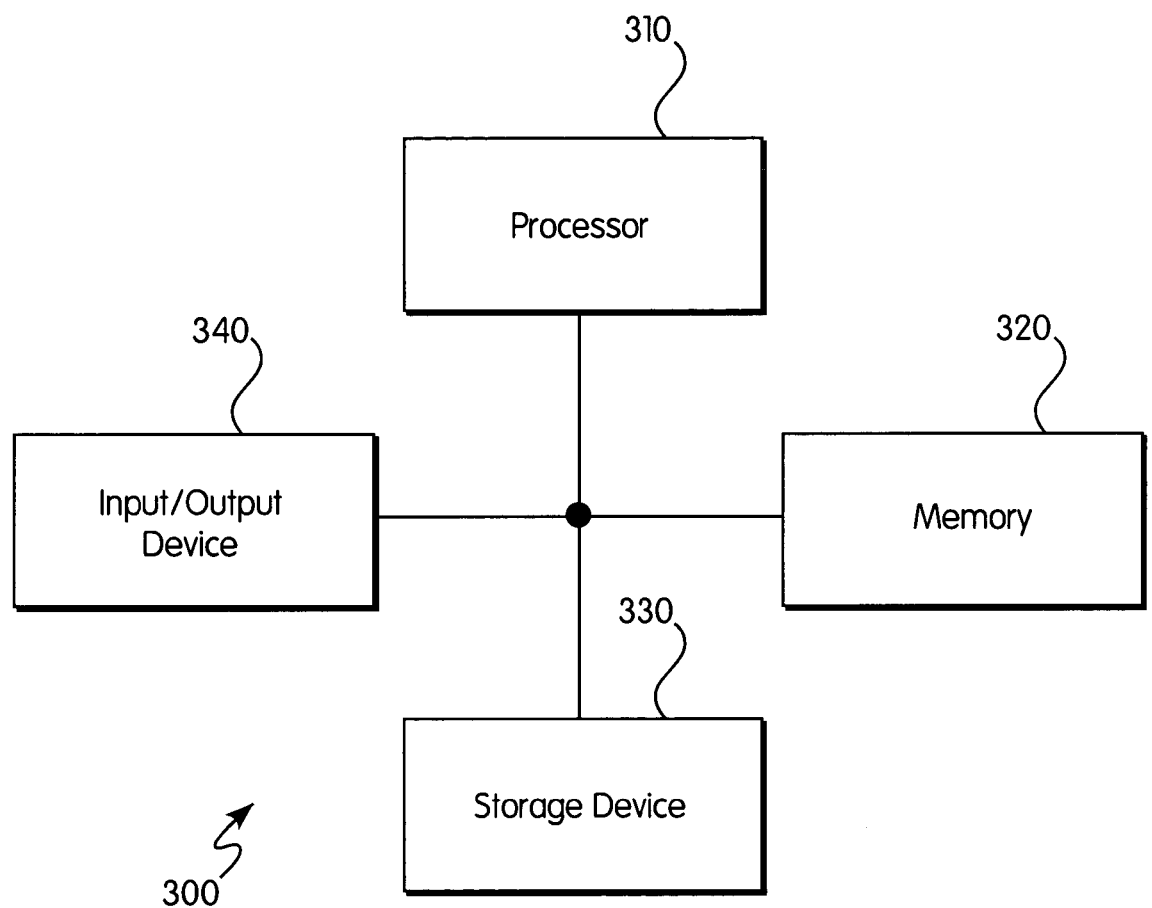
FIG. 3 shows a block diagram of a general computer system.

FIG. 3 is a block diagram of a computer system 300 that can be used in the operations described above, according to one embodiment. The system 300 includes a processor 310, a memory 320, a storage device 330 and an inpuvoutput device 340. Each of the components 310, 320, 330 and 340 are interconnected using a system bus 350. The processor 310 is capable of processing instructions for execution within the system 300. In one embodiment, the processor 310 is a single-threaded processor. In another embodiment, the processor 310 is a multi-threaded processor. The processor 310 is capable of processing instructions stored in the memory 320 or on the storage device 330 to display graphical information for a user interface on the inpuvoutput device 340. Particularly, the processor 310 can execute suitable instructions for the above-described handling of data objects and control objects.

The memory 320 stores information within the system 300. In one embodiment, the memory 320 is a computer-readable medium. In one embodiment, the memory 320 is a volatile memory unit. In another embodiment, the memory 320 is a non-volatile memory unit.

The storage device 330 is capable of providing mass storage for the system 300. In one embodiment, the storage device 330 is a computer-readable medium. In various different embodiments, the storage device 330 may be a floppy disk device, a hard disk device, an optical disk device, or a tape device.

The memory 320, the storage device 330, or both, may hold the data objects and control objects described herein.

The input/output device 340 provides input/output operations for the system 300. In one embodiment, the input/output device 340 includes a keyboard and/or pointing device. In some embodiments, the input/output device 340 includes a display unit for displaying graphical user interfaces. Particularly, the input/output device 340 may include suitable interface(s) for a user to create the data objects and control objects described herein.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of managing data administration, the method comprising:
   receiving in a computer system having at least one processor and one memory a first input identifying a data object to be assigned to a control object in the computer system;
   receiving in the computer system a second input for the control object, the second input specifying a relationship between 1) model-level changes to the data object, and 2) instance-level changes to the data object;
   after receiving the first and second inputs, sending the control object to another computer system, the control object including data suitable for:
   determining, at the other computer system, whether the computer system is authorized to make a change to the data object;
   determining, at the computer system, whether the other computer system is authorized to make a change to the data object; and
   accessing the control object to determine whether the other computer system is authorized to make a change to the data object.

2. The method of claim 1, wherein the computer system makes an object change to the data object after sending the control object and sends the object change to the other computer system.

3. The method of claim 2, wherein the other computer system accesses the control object upon receiving the object change and determines whether the computer system is authorized to make the object change.

4. The method of claim 1, wherein the other computer system changes the data object after receiving the control object and sends the object change to the computer system.

5. The method of claim 4, wherein the computer system accesses the control object upon receiving the object change and determines whether the other computer system is authorized to make the object change.

6. The method of claim 1, wherein the control object specifies, for a particular segment of the data object, a control system that is authorized to change the particular segment.

7. The method of claim 6, wherein the particular segment is one selected from a group consisting of a product, a location, a plant, a language, and combinations thereof.

8. The method of claim 6, wherein the control object further specifies an exception where another control system is authorized to change the particular segment.

9. The method of claim 6, wherein a change to the particular segment that is not made by the control system is rejected.

10. The method of claim 1, wherein the first input specifies that a newly created object is to be assigned to the control object, further comprising using the first input to create an object allocation rule for the control object.

11. The method of claim 10, wherein the newly created object is assigned to the control object because the newly created object belongs to a class identified by the object allocation rule. level changes.

12. The method of claim 1, wherein the relationship comprises that a control system that can make the model-level changes can overwrite the instance-level changes.

13. The method of claim 1, wherein the relationship comprises that a control system that can make the model-level changes should not overwrite the instance-level changes.

14. The method of claim 1, further comprising assigning the control object to a class of data objects including the data object.

15. The method of claim 1, further comprising: receiving, in the computer system, another control object for the data object, the other control object being older than the control object; and rejecting the other control object.

16. The method of claim 1, further comprising receiving a third input in the computer system to change the control object.

17. The method of claim 16, further comprising sending the changed control object to the other computer system.

18. A computer-readable storage medium comprising instructions, which when implemented by one or more processors perform the following operations:

receive in a computer system a first input identifying a data object to be assigned to a control object in the computer system;

receive in the computer system a second input for the control object, the second input specifying a relationship between 1) model-level changes to the data object, and 2) instance-level changes to the data object;

after receiving the first and second inputs, send the control object to another computer system, the control object including data suitable for:

determining, at the other computer system, whether the computer system is authorized to make a change to the data object;

determining, at the computer system, whether the other computer system is authorized to make a change to the data object; and accessing the control object to determine whether the other computer system is authorized to make a change to the data object.

19. The computer-readable medium of claim 18, wherein the operations further comprise: receive, in the computer system, an object change to the data object made by the other computer system; access the control object upon receiving the object change; and determine whether the other computer system is authorized to make the object change.

20. The computer-readable medium of claim 18, wherein the operations further comprise: receive, in the computer system, another control object for the data object, the other control object being older than the control object; and reject the other control object.

* * * * *

UNITED STATES PATENT AND TRADEMARK OFFICE
CERTIFICATE OF CORRECTION

PATENT NO. : 7,593,916 B2  Page 1 of 1
APPLICATION NO. : 10/921512
DATED : September 22, 2009
INVENTOR(S) : Heusermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Fourteenth Day of December, 2010

David J. Kappos
*Director of the United States Patent and Trademark Office*